April 21, 1959     H. A. FRY     2,882,763
BORING TOOL AND METHOD FOR MAKING SAME Filed May 2, 1956

INVENTOR.
HUGH A. FRY
BY
HIS ATTORNEYS

United States Patent Office 2,882,763
Patented Apr. 21, 1959

2,882,763

BORING TOOL AND METHOD FOR MAKING SAME

Hugh A. Fry, Dayton, Ohio

Application May 2, 1956, Serial No. 582,180

9 Claims. (Cl. 77—58)

This invention relates to an improved boring tool and more particularly to a boring tool filled with a vibration damping medium and to the method for making the boring tool.

The boring tool of this invention is of the type comprising an elongated cylindrical shaft adapted at one end for insertion into a chuck, or other holding device, the other end being adapted to support a suitable cutting tool. The cutting tool is frequently employed for enlarging an existing hole or aperture in the metal to be worked.

In such operations, either the work piece or boring tool is rotated as the boring tool is driven axially into the existing hole in the work piece, causing the cutting tool, held by the boring tool, to sweep out a helical path in the wall of the work adjacent the aperture therein. When the boring tool is relatively long in comparison to its diameter, the stresses to which the boring tool is subjected at its ends are sufficient to produce strain or flexure throughout the length of the tool. In practice, the intermittent strain or flexure of the boring tool creates a vibration, which is termed chatter. When chatter is present in the boring operation, the work is cut unevenly.

An object of this invention is to provide an improved chatter resistant boring tool having a tubular body portion wherein the thickness of the wall of the body portion is varied so as to suppress vibration of the boring tool.

Another object of this invention is to provide a tubular boring tool filled with an inelastic medium, such as lead, which medium operates to damp vibration of the boring tool.

Another object of this invention is to provide a boring tool hardened by heat treatment in such a manner that greatest hardness is effected where susceptibility to wear is greatest and less hardness is effected where the boring tool is most subject to strain and therefore greatest elasticity and strength is required.

Still another object of this invention is to provide a method for making a boring tool whereby improved hardness and vibration damping characteristics are obtained in a boring tool of exceptional strength.

A further object of this invention is to provide in a boring tool an improved means for adjustably supporting a cutting tool.

Other objects and advantages reside in the construction of parts, the combination thereof and the mode of operation, as will become more apparent from the following description.

Figure 7:
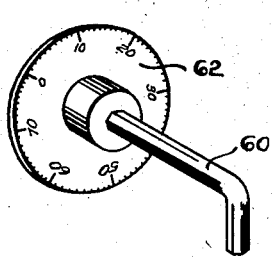
Figure 7 is a perspective view of a wrench utilized in adjusting the boring tool.

Referring to the drawing in detail, the main body of the boring tool is a cylindrical casing indicated by the reference numeral 10. The casing 10, which may be formed from any suitable steel alloy, has been bored to provide a plurality of aligned, interconnecting, cylindrical cavities 12a, b, c, d, e, f, g, h, i, j, of varying diameter. The cavity 12a, having the smallest diameter, extends from one end of the casing 10 substantially one-third the length of the casing. Cavities 12b to 12j are distributed throughout the remaining two-thirds of the casing 10, the cavities increasing in diameter in a non-uniform stepwise manner. The cavity 12j, having the largest diameter, is adjacent the end of the casing 10 opposite the cavity 12a.

The cavities 12b to 12j also vary in axial length in an irregular manner. The effect of the cavities 12a to 12j in the casing 10 is to produce an irregular tapering of the radial thickness of the annular wall of the casing 10.

Figures 1, 5, 6:
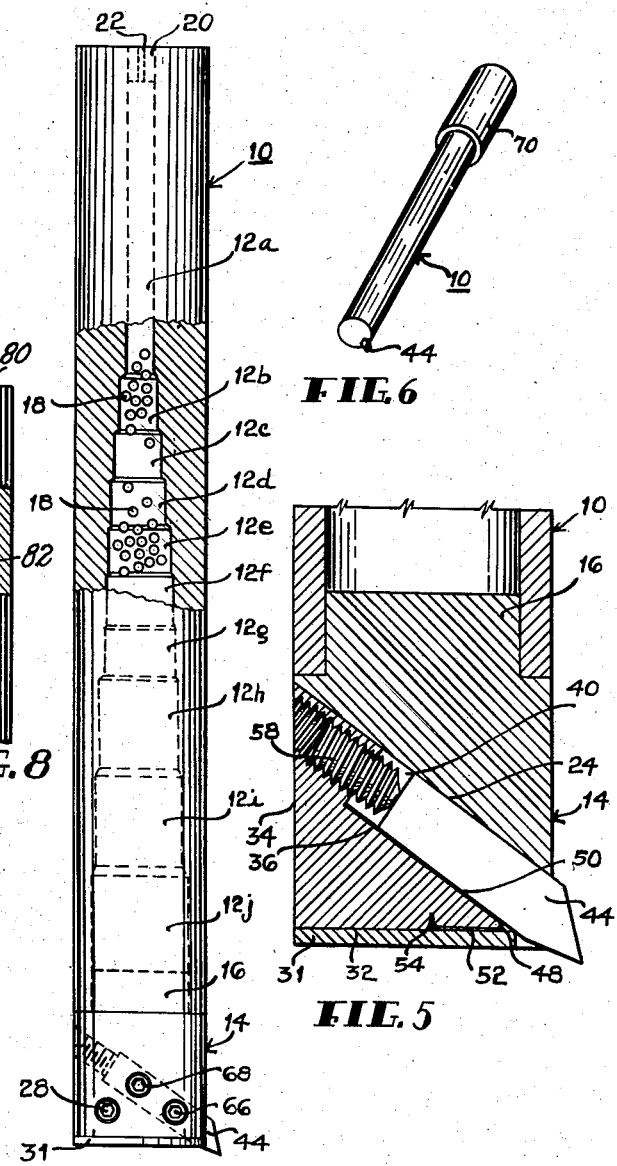
Figure 1 is an elevational view of the boring tool with a portion broken away to reveal the interior structure.
Figure 5 is an enlarged sectional view taken substantially along the line 5—5 of Figure 4.
Figure 6 is a perspective view in reduced scale of the boring tool of Figure 1 provided with a shank adapted for insertion into a chuck, or other holding device.
Figure 4:
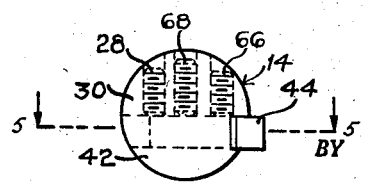
Figure 4 is a bottom plan view of the boring tool.

The casing 10 is closed at the end adjacent the cavity 12j by a plug 14 shown in enlarged detail in Figure 5. The plug 14, which is substantially cylindrical in shape is provided with a projecting portion 16 of reduced diameter adapted to press fit snugly in the end of the cavity 12j. The plug 14 is secured to the casing 10 by furnace copper brazing effected at approximately 2100° F., the casing 10 and plug 14 being cooled slowly to room temperature after brazing.

Following the brazing process, the casing 10 is heated to 1500–1700° F., then quenched, to harden the casing. Although hardening of this type is frequently practiced in boring tool manufacture, the result obtained in the present invention is distinctive. Due to the tapered wall thickness of the casing 10, the thinner wall portions are quenched or cooled more rapidly than the thicker wall portions, producing a greater hardness in the thinner wall portions, there being a gradual reduction in hardness as the wall portion increases in thickness.

As will be described in the following, the plug 14 is adapted to support a suitable cutting tool and the end of the casing 10, opposite the plug 14, is adapted for insertion into a suitable holding device. When the boring tool is in operation and metal is being cut, the cut metallic chips tend to impinge upon and abrade the wall of the casing 10 adjacent the cutting tool. It is this portion of the casing 10 which is subject to the greatest abrasive wear from flying chips. In contrast, the opposite end of the boring tool is subjected to the greatest tensile stresses due to the large moment arm existing between this end of the boring tool and the cutting tool. In view of these factors the heat treatment and quenching of the casing 10 has important beneficial results for it provides maximum hardness where the tendency for abrasive wear of the casing 10 is greatest, and reduced hardness with greater elasticity and strength where the tensile stresses to which the casing 10 is subjected are greatest.

It is well known in the art that the mere hollowing of a cylindrical boring tool improves the chatter characteristics. The present invention further improves chatter characteristics by tapering the wall of the tubular casing, an effect which is enhanced by the irregular tapering of the casing as shown in Figure 1.

In order to further damp the vibration of the boring tool, and thereby improve the chatter resistant characteristics of the boring tool, the cavities 12a to 12j in the casing 10 are filled with lead pellets 18, as indicated in Figure 1, the pellets being introduced into the casing through the cavity labeled 12a. When the casing has been filled almost completely with pellets, hot grease is poured into the cavity so as to fill the interstices between adjacent pellets.

After the grease has cooled, a plug 20 is press fitted into the end of the casing 10 in the cavity 12a, the plug being tamped down to the level of the lead pellets therein. Any excess grease is squeezed out through an aperture 22 in the plug 20. After the plug 20 is tamped into position, a small pin (not shown) is driven into the aperture 22 so as to close the aperture. The insertion of the pin creates a slight positive pressure in the interior of the casing 10.

Figure 8:
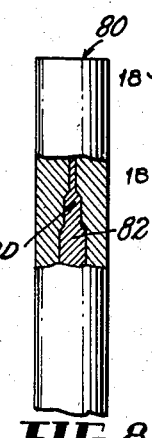
Figure 8 is a fragmentary elevational view of a modified boring tool with a portion broken away to reveal the interior structure.

Illustrated in Figure 8 is a modified boring tool comprising a casing 80, substantially identical in construction to the casing 10 of the preferred embodiment, into which molten lead has been poured to produce a solid lead filling 82. The use of a solid lead filling is found to produce an improved chatter resistance in the same manner as the lead pellet and grease filling of the preferred embodiment. However, the use of lead pellets and grease, as described herein, is preferred for the reason that the lead may be introduced into the boring tool in solid, rather than molten form.

It will become apparent to one skilled in the art that inelastic materials other than lead may be employed satisfactorily for the purpose of damping vibration in the boring tool. For example, compressed iron or steel filings may be employed for reducing chatter although the reduction in chatter is less pronounced as compared to that obtained through the use of lead pellets. For optimum chatter reduction, the damping medium should have high mass and low elasticity.

In adapting the boring tool for supporting a cutting tool, the end of the plug 14 opposite the projection 16 is provided with a transverse slot lying in a plane parallel to the axis of the plug 14. The slot is milled at an oblique angle so as to provide in the plug 14 a base portion labeled 24 extending at an acute angle to the axis of the plug 14. A substantially triangular-shaped block 26 is fitted into the transverse slot and secured by a set screw 28, threadedly engaging a prong 30 of the plug 14 adjacent the slot therein. The slotted end of the plug 14 is closed by an end plate 31 which may be brazed to the plug 14 during the aforementioned brazing process.

Figure 3:
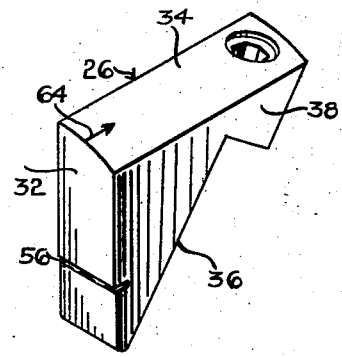
Figure 3 is an enlarged perspective view of a block employed in the boring tool for engaging a cutting tool.

The triangular block 26, as best seen in Figure 3, has two side surfaces 32 and 34 extending normal to one another and a surface 36 forming the hypotenuse of a right triangle including the sides 32 and 34. The side 34 of the block 26 is extended to provide a projection 38 adjacent the hypotenuse 36. The projection 38 engages the base portion 24 of the plug 14, so as to properly space the block 26 within the plug 14. A transversely directed cavity 40 is thereby provided in the plug 14, the cavity being bounded by the hypotenuse side 36 and projection 38 of the triangular block 26, and the base portion 24, the prong 30, and a parallel prong 42 of the plug 14.

Figure 2:
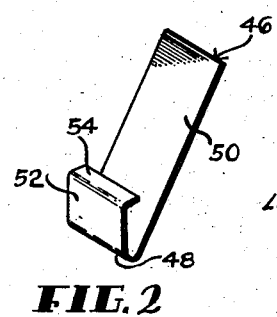
Figure 2 is an enlarged perspective view of a spring element employed in this invention.

The cavity 40 receives a cutting tool indicated by the reference numeral 44. A spring element 46, shown in Figure 2 is secured along the hypotenuse side 36 of the block 26 so as to bias the cutting tool 44 into friction engagement with the base portion 24 of the plug 14. The spring element 46 is substantially a flat sheet of spring metal bent along the line 48 to provide two legs 50 and 52 extending at an acute angle substantially equal to the angle between the sides 32 and 36 of the block 26. Thus, when the leg 52 of the spring element is positioned parallel to the side 32 of the block 26, the leg 50 of the spring element extends into the cavity 40 adjacent the hypotenuse side 36 of the block 26. Though not shown in the drawing, the leg 50 is arched or bowed to provide a yieldable spring element. The end 54 of the leg 52 of the spring element is folded substantially normal to the leg 52 to engage a slot 56 provided therefor in the side 32 of the block 26. The arrangement of the spring element 46 in engagement with the block 26 is best seen in Figure 5. When the cutting tool 44 is inserted into the cavity 40, the leg 50 of the spring element 46 must be flattened, thus creating a biasing tension.

The cutting tool 44 is adjustably positioned in the cavity 40 by means of a screw element 58 threadedly engaging the projection 38 of the block 26, and having the inward end thereof in abutment with the cutting tool 44. A wrench 60, such as that shown in Figure 7, is provided for rotating the screw element 58.

A graduated dial 62, slidably secured to the wrench 60, cooperates with a suitable indicating mark, such as that shown at 64 in Figure 3, to indicate the angular rotation of the screw element 58. In making fine adjustment of the cutting tool 44, the tool is always driven outwardly of the cavity 40 an amount determined by the graduated dial 62. By making the adjustment always in the same direction, errors due to backlash are eliminated.

Set screws 66 and 68, threadedly engaging the prong 30 of the plug 14, are provided for clamping the cutting tool 44 in place after the fine adjustment of the tool has been effected.

As shown in Figure 6, the boring tool may be provided with a suitable shank portion 70 adapted for insertion into a chuck. As a convenience and economy in fabricating the boring tool, the shank portion may be brazed to the casing 10 during the aforementioned brazing treatment, although it is no limitation in the present design to make the shank portion integral with the casing 10. The shank portion 70 may take any desired shape.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A boring tool including a cylindrical casing having an axially extending cavity therein, said casing having an annular wall the thickness of which varies axially in a stepwise manner, inelastic means substantially filling the cavity in said casing and means carried by said casing for supporting a cutting tool.

2. A boring tool according to claim 1 wherein the inelastic means substantially filling the cavity in said casing includes lead pellets, and grease distributed in the interstices between adjacent pellets so as to provide a vibration damping medium.

3. A boring tool according to claim 1 wherein the annular wall of said casing is hardened, the hardness and strength of said wall being substantially in inverse proportion to the radial thickness thereof.

4. In a boring tool, tool support means providing a cavity in said boring tool adapted to receive a cutting tool, spring means disposed in said cavity for biasing said cutting tool into friction engagement with said support means, means for retaining said spring means in position within said cavity, a rotatable screw element disposed in the bottom of said cavity threadedly engaging said support means in abutment with said cutting tool whereby rotation of said screw element displaces said cutting tool, and means for locking said cutting tool in fixed position in said cavity.

5. The method of making a cylindrical tool support, including the steps of repeatedly boring a substantially cylindrical bar of steel alloy to provide therein an irregularly tapered axially extending cavity, said bar thereby having an annular wall the radial thickness of which varies axially in a stepwise manner, and heating and quenching said bar so as to harden the metal thereof, the hardness being in inverse proportion to the radial thickness of said wall.

6. The method of making a cylindrical tool support including the steps of repeatedly boring a substantially cylindrical bar of steel alloy to provide therein an irregularly tapered axially extending cavity, said bar thereby having an annular wall the radial thickness of which varies axially, inserting a plug in one end of said cavity, brazing the plug to the bar, heating and quenching said bar so as to harden the metal thereof, the hardness of the metal in said bar being in inverse proportion to the radial thickness of the annular wall thereof, substantially filling said cavity with a substantially inelastic medium, and plugging the open end of said cavity.

7. The method of making a cylindrical tool support including the steps of repeatedly boring a substantially cylindrical bar of steel alloy to provide therein an irregularly tapered axially extending cavity, said bar thereby having an annular wall the radial thickness of which varies axially in a stepwise manner, inserting a plug in one end of said cavity, brazing the plug to the bar, heating the bar to approximately 1600° F., quenching the bar so as to harden the metal thereof, the hardness of the metal in said bar being in inverse proportion to the radial thickness of the annular wall thereof, substantially filling said cavity with lead pellets, filling the remainder of said cavity with hot grease, the grease filling the interstices between adjacent lead pellets, and plugging the open end of said cavity.

8. A boring tool including a cylindrical casing having an axially extending cavity therein, said casing having an annular wall the thickness of which varies axially in a stepwise manner, said annular wall being hardened, the hardness of said wall being substantially in inverse proportion to the radial thickness thereof, and means carried by said casing for supporting a cutting tool.

9. A boring tool including an elongate casing having an axially extending cavity therein, said casing having an annular wall the thickness of which varies axially in a stepwise manner, and inelastic means substantially filling the cavity in said casing.

References Cited in the file of this patent

UNITED STATES PATENTS

| Re. 16,061 | Thurston | May 25, 1925 |
| Re. 17,557 | Thurston | Jan. 7, 1930 |
| 619,450 | Turton | Feb. 14, 1899 |
| 851,399 | Brownstein | Apr. 23, 1907 |
| 1,140,261 | Pattinson | May 18, 1915 |
| 1,736,449 | Lipp | Nov. 19, 1929 |
| 1,807,126 | Morrill | May 26, 1931 |
| 2,359,210 | Engel | Sept. 29, 1944 |
| 2,591,115 | Austin | Apr. 1, 1952 |
| 2,641,940 | White | June 16, 1953 |
| 2,656,742 | Poole | Oct. 27, 1953 |

FOREIGN PATENTS

| 1,016,808 | France | Sept. 3, 1952 |